United States Patent [19]

Brycki

[11] Patent Number: 4,718,651
[45] Date of Patent: Jan. 12, 1988

[54] SELF-ACTING DUAL-MODE CLAMP

[75] Inventor: Bogdan Brycki, Maple Shade, N.J.

[73] Assignee: RCA Corporation, Princeton, N.J.

[21] Appl. No.: 947,862

[22] Filed: Dec. 30, 1986

[51] Int. Cl.⁴ .............................................. B23Q 3/08
[52] U.S. Cl. ................................ 269/94; 269/254 CS
[58] Field of Search ............ 279/1 L, 6, 96 R, 1 DC, 279/1 DA, 1 P, 106, 35; 81/391, 405, 406, 407, 411, 412; 269/303–305, 91–94, 254 CS, 237–239, 235

[56] References Cited

U.S. PATENT DOCUMENTS

| | | | |
|---|---|---|---|
| 1,442,083 | 1/1923 | Meyer | 81/412 |
| 2,908,205 | 10/1959 | Furman et al. | 269/94 |
| 3,170,214 | 2/1965 | Cochrane | 269/94 |
| 3,503,602 | 3/1970 | Waara | 269/235 |
| 4,451,026 | 5/1984 | Coope | 269/93 |
| 4,489,926 | 12/1984 | Blatrix | 269/93 |
| 4,508,327 | 4/1985 | Ersoy | 269/91 |

FOREIGN PATENT DOCUMENTS

| | | | |
|---|---|---|---|
| 2000372 | 7/1971 | Fed. Rep. of Germany | 279/1 L |
| 135455 | 5/1979 | Fed. Rep. of Germany | 269/91 |
| 3316743 | 11/1984 | Fed. Rep. of Germany | 269/93 |

*Primary Examiner*—Robert C. Watson
*Attorney, Agent, or Firm*—Allen L. Limberg; William Squire

[57] ABSTRACT

A jaw is secured to a stem member having a T-shaped slot through which a pair of spaced pins pass. When the jaw and member are displaced from a clamp position to a neutral position, one of the pins is aligned with the T portion of the slot and the other pin is seated at one end of the main slot. The member tilts automatically to a retracted state in response to a spring force in a given direction. When the member is rotated from the retracted state to the neutral position the same spring force slides the jaw into the clamp position. A resilient projection on the stem member automatically engages a workpiece when the member reaches the neutral position to locate the workpiece prior to clamping.

12 Claims, 7 Drawing Figures

SELF-ACTING DUAL-MODE CLAMP

This invention relates to a clamp structure.

Workpiece clamps are actuable between a first clamp position which forces a workpiece against a supporting surface, and a second retracted position which releases the workpiece. In U.S. Pat. No. 4,489,926 a relatively complex clamp mechanism is illustrated employing a number of separate pivotable connector links. A need is seen for a more simple clamping mechanism which can rapidly and simply engage and release a workpiece.

A dual acting clamp mechanism according to the present invention comprises a support and a jaw member movably secured to the support. A jaw displacement means includes a male element receiving means coupled to one of the member and support, a pair of spaced male elements secured to the other of the support and member engaged with the element receiving means and a spring coupled to the member and support. The elements, element receiving means and spring are arranged such that the jaw member has a first clamp position, a second release position and a third neutral position. The arrangement is such that the jaw member automatically assumes the release position in response to a first force in a first direction on the member which places the member in the neutral position from the clamp position. The jaw member automatically assumes the clamp position in response to a second force on the member in a second direction different than the first direction which places the member in the neutral position from the release position. Thus, by merely displacing the jaw member to the neutral position either from the clamp position or release position, the jaw member automatically assumes the other position without additional external forces being applied thereto.

In the drawing:

FIGS. 5a, 5b, and 5c are different sectional elevation views of the clamping assembly of the embodiment of FIG. 1 showing different assembly positions wherein FIG. 5a is a clamp position, FIG. 5b is a neutral position, and FIG. 5c is a retracted release position.

Figure 1:
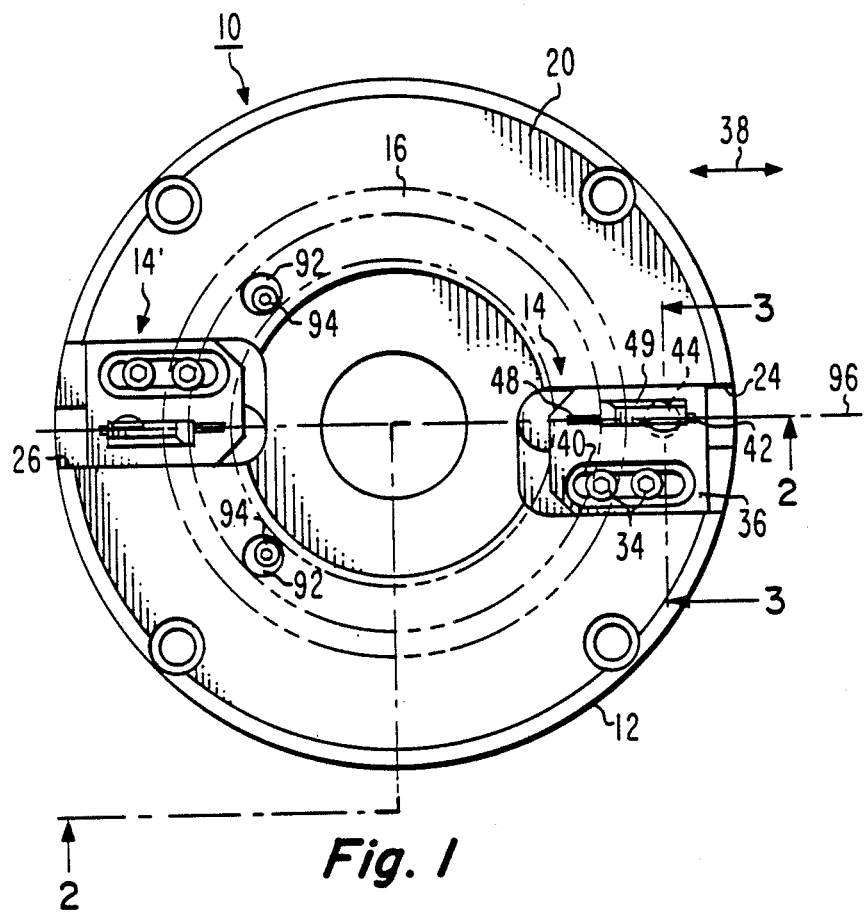
FIG. 1 is a plan view of a clamp apparatus in accordance with one embodiment of the present invention with a workpiece shown in phantom.
Figure 2:
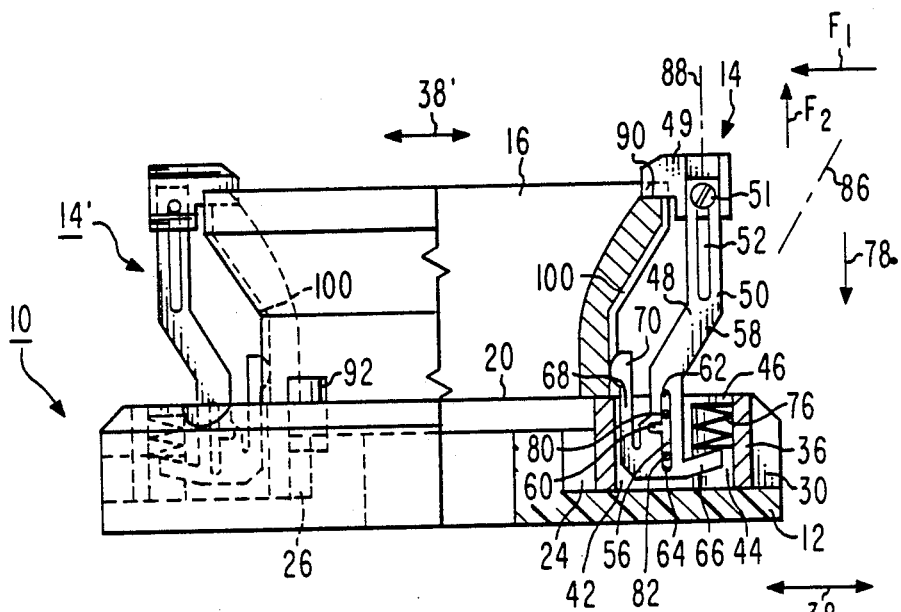
FIG. 2 is a sectional elevation view of the embodiment of FIG. 1 taken along lines 2—2 with the workpiece shown in solid.

In FIG. 1, clamp assembly 10 comprises a base 12 and a pair of diametrically opposed dual acting clamps 14 and 14' secured to base 12. Clamps 14 and 14' are identical and, therefore, only one will be described herein. A workpiece, shown in phantom in FIG. 1 for simplicity of illustration, is clamped to base 12 by clamps 14 and 14', and is, by way of example, a somewhat conical shaped ferro magnetic material core as best seen in FIG. 2. In FIG. 2, clamp 14 responds automatically to forces $F_1$ or $F_2$ which respectively place the clamp in a clamp or retracted state as will be explained more fully below.

Figure 3:
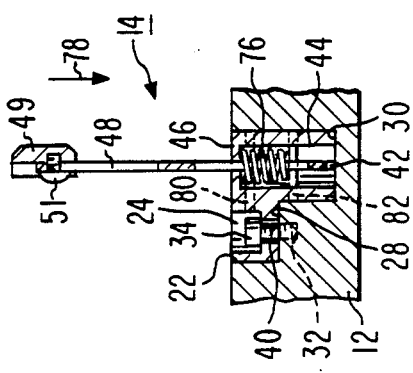
FIG. 3 is a sectional elevation view of the embodiment of FIG. 1 taken along lines 3—3.

Base 12, like the workpiece 16, FIG. 1, is circular. Base 12 has a planar workpiece receiving surface 20. Formed in surface 20 are two opposed identical radially extending stepped slots 24 and 26. In FIG. 3, representative slot 24 is inverted L-shaped in end elevation having a shallow recess 22 formed by shoulder 28 and a deeper recess 30. A pair of threaded apertures 32 are in shoulder 28. A pair of screws 34 (FIG. 1) secure clamp 14 to base 12 in slot 24.

In FIGS. 2 and 3, representative clamp 14 includes an L-shaped support 36 which is closely received in slot 24 and is flush with base surface 20. Support 36 is shorter than slot 24, in radial directions 38 and is adjustably secured in slot 24 for displacement in radial directions 38. Screws 34 are secured in elongated, stepped support 36 slot 40 for purposes of setting that adjustment. Support 36 portion in recess 30 has a relatively thin slot 42 extending in directions 38. A circular opening 44 is formed in support 36 normal to directions 38 in communication with slot 42. Support 36 includes a flange 46 over opening 44 which is flush with base surface 20.

Figure 4:
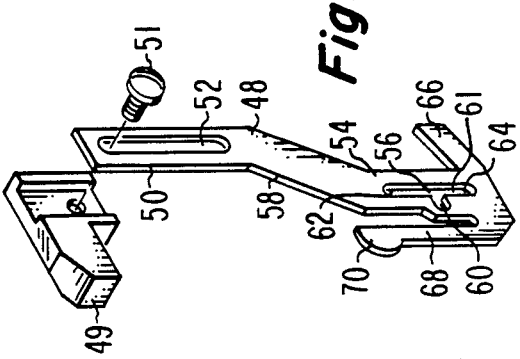
FIG. 4 is an isometric exploded view of a portion of the clamping assembly employed in the embodiment of FIG. 1.

In FIGS. 2 and 4, clamp 14 includes a stem member 48 and a clamp jaw 49 which is adjustably attached to member 48 via screw 51 and member slot 52. Clamp member 48 comprises a thin flat stock, which may be sheet steel, having a first leg 50 containing slot 52 and a second leg 54 containing slot 56 parallel to slot 52 and to axis 88. A transverse member 58 couples leg 50 to leg 54 with slots 52 and 56 offset. Slot 56 is T-shaped, having a secondary slot portion 60 normal to axis 88 and in communication with the relatively longer main portion 61 (FIG. 4). Secondary portion 60 has the same transverse width as the slot 56 main portion 61 which is of uniform transverse width throughout its length. The distance from portion 60 to end 62 of slot 56 parallel to the slot 56 length dimension is smaller than the distance to the other end 64.

Member 48 has a leg 66 which extends from the end of leg 54. Leg 66 is tilted toward slot 52. Extending upright from the extended end of leg 54 in a direction opposite leg 66 is a clamping element 68. The clamping element 68 is parallel to slots 52 and 56 and includes a curved projection 70 at its upper extended end.

The lower portion of leg 54 including leg 66 and most of slot 56 and slot portion 60 are within the support 36 slot 42. Leg 66 is in circular opening 44 aligned with flange 46, FIG. 2. A compression spring 76 is in opening 44 and abuts flange 46 at one end and leg 66 at the other end under compressive load which forces leg 66 in direction 78. A pair of circular cylindrical pins 80 and 82 have diameters which are the same and dimensioned to be slidably received in slot 56. The pins 80 and 82 are secured to support 36 and pass through support slot 42 and member 48 slot 56.

Figure 5C:
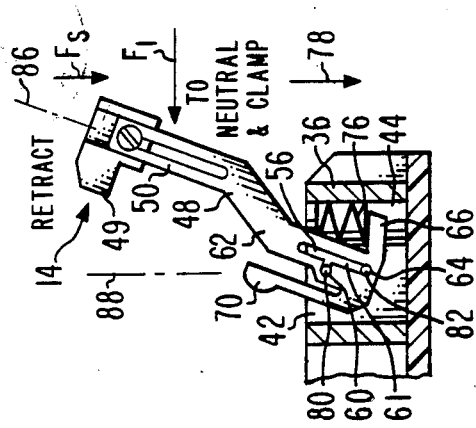
Figure 5B:
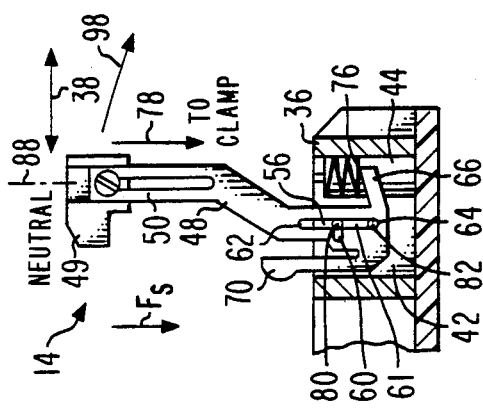

The spacing of the pins 80 and 82, FIG. 5b, along the length of the main portion 61 of slot 56 parallel to axis 88 normal to directions 38 is such that when pin 82 abuts end 64, pin 80 is aligned with and can enter slot portion 60 in directions 38. In this position, FIG. 5b, the force $F_s$ of spring 76 on leg 66 in direction 78 tends to pivot member 48 about pin 82 whereby pin 80 enters slot portion 60, tilting member 48 to a retracted orientation of FIG. 5c. In this orientation, jaw 49 is on axis 86 which is angularly displaced about pin 82 from the axis 88, FIG. 5b.

Figure 5A:
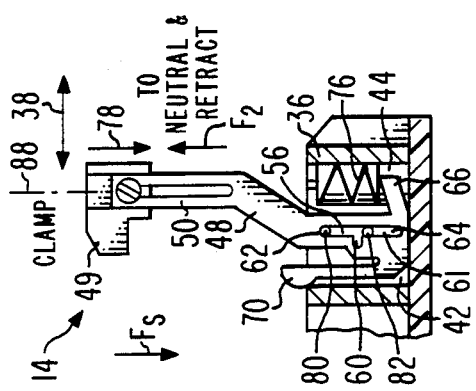

In FIG. 5a, pin 82 is misaligned with slot portion 60 when pin 80 abuts end 62 of slot 56. In this alignment, stem member 48 is aligned on axis 88 in a clamp position. Jaw 72 is at its lowermost position in direction 78. The stem member 48 is locked upright and cannot tilt about pins 80 or 82. The spring 76 force $F_s$ on leg 66 urges and maintains member 48 in the clamp mode, as also illustrated in FIG. 2. In this position, projection 70 of the clamping element 68 stiffly engages the side of the workpiece 16 urging the workpiece in direction 38'.

In FIG. 1, a pair of eccentrically mounted circular cylindrical workpiece locating members 92 are secured to base 12. By rotating a member 92 about its screw 94, the relative position of the workpiece along axis 96 can be adjusted. The projection 70 of element 68 in the clamping mode, FIG. 2, resiliently urges the workpiece 16 in direction 38' in abutting relation against locating members 92 to accurately position the workpiece 16.

In operation of the clamp 14, the clamp is normally either in the clamp position of FIG. 5a or in the retracted release position of FIG. 5c. Force $F_1$, FIG. 5c, is applied to the stem member 48 in a direction transverse axis 88 and is sufficient to overcome the force $F_s$ induced by spring 76 on leg 66. Force $F_1$ rotates stem member 48 about pin 82 until pin 80 emerges from slot portion 60 at the main portion 61 of slot 56, FIG. 5b, placing member 48 in a neutral position. However, member 48 does not remain in this position but automatically continues to a third clamp position, direction 78, FIG. 5a, in response to the spring force $F_s$. As soon as the stem member 48 is rotated from the position of FIG. 5c to the neutral position of FIG. 5b, the force $F_s$ snaps the stem member 48 into the clamp position of FIG. 5a. In this action, stem member 48 slides in slot 56 until pin 80 abuts slot 56 end 62.

Assuming the clamp 14 is in the clamp mode, FIG. 5a, a force $F_2$ is applied to the stem member 48 in a direction opposing the spring force $F_s$ on leg 66. This slides the stem member 48 into the neutral position of FIG. 5b. Once the stem member 48 is in the neutral position, the spring force $F_s$ creates a torque which causes stem member 48 to rotate in direction 98. This rotation occurs automatically as soon as the member 48 reaches the neutral position. Force $F_s$ rotates the stem member to the retracted position of FIG. 5c. The spring force $F_s$ thus provides automatic dual snap-action clamp-release functions on clamp 14.

When the projection 70 of the stem clamping element 68 assumes the neutral position of FIG. 5b, it automatically engages the workpiece prior to clamping. This action automatically forces the workpiece against the locating members 92, FIG. 1, locating the workpiece prior to clamping. The second clamp 14', is operated after clamp 14 is operated to more securely clamp the workpiece to the base 12.

The terms "slot" and "pins" as employed herein are intended to be of general description rather than limiting. That is, slots need not be entirely through a structure, but may also include grooves, recesses, and openings. The term "pins" is intended to include pins, projections and pertuberances. The important point is that a pair of spaced male elements on one of the support or stem member mate with a female structure on the other of the support and stem member and cooperate with a spring to provide the dual-action clamping function as described above in connection with FIGS. 5a, 5b, and 5c.

The stem members of clamps 14 and 14' are aligned diametrically opposite each other on axis 96 to provide opposing forces to the workpiece 16 centrally of the workpiece. Additionally, the workpiece may have grooves 90 and 100 for receiving the respective jaws 49 and projections 70 of the clamping element 68 for angularly locating the workpiece relative to the clamps.

What is claimed is:

1. A dual acting clamp mechanism comprising:
   a support;
   a jaw member movably secured to the support; and
   jaw displacement means including male element receiving means comprising a T-shaped slot in one of the member and support, a pair of spaced pin elements secured to the other of the member and support engaged with the receiving means slot and a spring coupled to the member and support, said elements, element receiving means and spring being arranged such that the jaw member has a first clamp position, a second release position and a third neutral position, said jaw member automatically assuming the release position in response to a first force in a first direction on the member placing the member in the neutral position from the clamp position and automatically assuming the clamp position in response to a second force on the member in a second direction different than the first direction placing the member in the neutral position from the release position.

2. The mechanism of claim 1 wherein said elements are spaced such that said jaw member can rotate relative to the support when the receiving means and elements are in the second and third positions and can slide relative to the support in said first direction when the receiving means and elements are in the first and third positions.

3. The mechanism of claim 2 wherein said receiving means, elements, and spring are so positioned relative to each other such that the spring automatically slides the jaw member into the first clamp position when rotated from the second release position into the third neutral position and automatically rotates the jaw member into the second release position when the member is moved from the first to the third positions.

4. The mechanism of claim 1 wherein said T-shaped slot is in said jaw member.

5. A self-acting dual-mode spring loaded clamp comprising:
   a support;
   a clamp member having a clamp positioning slot defined by a main slot extending in a given direction and terminating at first and second ends and a secondary slot extending transversely to and in communication with the main slot in a region between said ends, the secondary slot having a first spacing from one of said slot ends and a second spacing different than the first spacing to the other of said slot ends;
   a clamp jaw secured to the member;
   first and second projections secured to the support in spaced relation and engaged with said positioning slot, said projections being spaced apart a distance having the value of one of said first and second spacings so that when one end of the main slot abuts the first projection in a first neutral position the secondary slot is aligned with the second projection to permit the second projection to enter the secondary slot wherein the member can pivot about the first projection to a second release position and when the other main slot end abuts the second projection in a third clamp position, the first projection is misaligned with said secondary slot so that the member can only move in a direction along said main slot to the first neutral position; and spring means coupled to the member for applying a force to the member in a direction parallel to said given direction, said projections, slot and spring means being arranged such that when the member is rotated from the second release position to the first neutral position, said force automatically displaces the member in a clamp mode to the third clamp position and when the member is displaced from the third clamp position to the first neutral position, the spring force automatically causes the member to pivot about the first projection to the second release position.

6. The clamp of claim 5 further including a centering element secured to the member adapted to exert a force on a clamped workpiece in a direction substantially transverse said given direction in said clamp mode.

7. The clamp of claim 6 further including a set of workpiece locating stops secured to the support adapted to locate said workpiece in a reference position in response to engagement of the workpiece by said centering element.

8. The clamp of claim 5 wherein said member includes a leg extending therefrom in a direction transverse said given direction on a side of the main slot opposite the secondary slot, said spring means including a spring coupled to said leg and said support.

9. The clamp of claim 5 including a plurality of said clamps secured to said support positioned in diametrically spaced facing relation.

10. A clamp comprising:
a stem;
means for securing a clamp jaw adjacent one end of the stem;
a T-shaped slot in said stem, the slot having a main portion extending along the length of the stem and a secondary portion transverse to and in communication with the slot main portion on one side of the main portion;
a pair of pins secured in fixed spaced relation passing through the T-shaped slot, the spacing of the pins being such that when one pin of the pair is at one end of the slot main portion in a first stem neutral position the other pin of the pair is aligned with the secondary slot portion while in the slot main portion and when said other pin of the pair is at the other end of the slot main portion in a second stem clamp position, the one pin of the pair is misaligned with the secondary slot portion, said stem assuming a pivoted retracted third position when the other pin is engaged with said secondary slot portion; and spring means for forcing the stem in a given direction from the first stem position so that said slot main portion other end at the second stem clamp position is automatically forced to abut the other pin of the pair in a clamp mode and said secondary slot is forced to engage said other pin and pivot the stem to the third retracted position when the stem is displaced to the first position from the third position in a clamp release mode.

11. The clamp of claim 10 wherein said stem includes projection means secured thereto for abutting a workpiece and forcing the clamped workpiece in a direction normal to the direction said stem is forced in said clamp mode.

12. A clamp comprising:
a support having an opening and an aperture in communication with the opening;
a pair of spaced pins secured to the support passing through said opening;
a clamp stem in said opening and having first and second stem slots, each stem slot at a different stem end and having a given length;
a clamp jaw secured to the stem at the first slot;
said pair of pins passing through said stem second slot, said pins being spaced apart a first distance smaller than the length of the second slot, said second slot including an enlarged region intermediate its ends so that only one of said pins can be aligned with and engage said enlarged region when the stem is displaced from a first clamp position to a second neutral position relative to the support, the alignment of said one pin with the enlarged region permitting said stem to pivot about the other pin from the second position to a third retracted position; and
a spring in said aperture abutting said stem and said support for creating a force on said stem relative to the support to urge the stem in such a direction so that when the stem is displaced from the first clamp position to the second neutral position the spring forces the stem to pivot to the third retracted position and when the stem is displaced from the third retracted position to the second neutral position, the spring forces the stem to displace to the first clamp position.

* * * * *